(12) United States Patent
Kelley et al.

(10) Patent No.: US 10,952,179 B2
(45) Date of Patent: Mar. 16, 2021

(54) RANKING AND GROUPING POSITIONING ASSISTANCE DATA FOR BROADCAST

(71) Applicant: Nokia Technologies Oy, Espoo (FI)

(72) Inventors: Sean Kelley, Hoffman Estates, IL (US); Manivannan Thyagarajan, Coppell, TX (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/663,609

(22) Filed: Oct. 25, 2019

(65) Prior Publication Data

US 2020/0059887 A1 Feb. 20, 2020

Related U.S. Application Data

(62) Division of application No. 15/897,631, filed on Feb. 15, 2018, now Pat. No. 10,499,358.

(51) Int. Cl.
| | |
|---|---|
| *H04W 24/00* | (2009.01) |
| *H04W 64/00* | (2009.01) |
| *H04W 4/06* | (2009.01) |
| *H04W 88/02* | (2009.01) |
| *H04W 88/08* | (2009.01) |
| *G01S 5/02* | (2010.01) |

(52) U.S. Cl.
CPC ............ *H04W 64/00* (2013.01); *H04W 4/06* (2013.01); *H04W 64/003* (2013.01); *G01S 5/0236* (2013.01); *H04W 88/02* (2013.01); *H04W 88/08* (2013.01)

(58) Field of Classification Search
CPC combination set(s) only.
See application file for complete search history.

(56) References Cited

U.S. PATENT DOCUMENTS

| | | | |
|---|---|---|---|
| 2013/0252630 A1 | 9/2013 | Edge et al. | |
| 2018/0324740 A1* | 11/2018 | Edge | G01S 5/0236 |

FOREIGN PATENT DOCUMENTS

WO  02/07458 A2  1/2002

OTHER PUBLICATIONS

"Assistance Information Broadcast Procedure in LPPa", Ericsson, 3GPP TSG-RAN WG3 #98, R3-174800, Nov.-Dec. 2017, 2 pgs.

(Continued)

*Primary Examiner* — Justin Y Lee
(74) *Attorney, Agent, or Firm* — Harrington & Smith

(57) ABSTRACT

At a network node, positioning assistance data blocks are determined to be requested to be broadcasted by a base station to a UE for use by the UE in calculating a position. A message is sent toward the base station with positioning assistance data blocks and corresponding information indicating to the base station that the base station is to admit or not admit for broadcasting positioning assistance data block(s) in response to insufficient resources at the base station to broadcast all the blocks. Indications are received of success or failure of broadcasting the positioning assistance data blocks, the success or failure based on the base station's admitting or not admitting, respectively, the positioning assistance data blocks. The base station determines which positioning assistance data blocks should be admitted or not admitted for broadcast and either broadcasts the admitted ones or does not broadcast the non-admitted ones.

20 Claims, 9 Drawing Sheets

(Solution A)

(56) References Cited

OTHER PUBLICATIONS

"WID Update: UE Positioning Accuracy Enhancements for LTE", Nokia, Nokia Shanghai Bell, 3GPP TSG RAN Meeting #78, RP-172313, Dec. 2017, 4 pgs.

"LPPa signaling frameworks for assistance data broadcast", Nokia, Nokia Shanghai Bell, 3GPP TSG-RAN WG3 Meeting #98, R3-174354, Nov.-Dec. 2017, 4 pgs.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 15), Section 13.2", 3GPP TS 36.300 V15.0.0, Dec. 2017, 3 pgs.

"3rd Generation Partnership Project; Technical Specification Group Radio Access Network; Evolved Universal Terrestrial Radio Access Network (E-UTRAN); S1 Application Protocol (S1AP) (Release 15), Sections 8.2.1.2 and 9.2.1.60", 3GPP TS 36.413 V15.0.0, Dec. 2017, 6 pgs.

"3rd Generation Partnership Project; Technical Specification Group Radio Access Network; Evolved Universal Terrestrial Radio Access (E-UTRA); LTE Position Protocol A (LPPa) (Release 14)", 3GPP TS 36.455 V14.4.0, Dec. 2017, 75 pgs.

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14)", 3GPP TS 36.305 V14.3.0, Sep. 2017, 78 pgs.

"3rd Generation Partnership Project; Technical Specification Group Radio Access Network; Evolved Universal Terrestrial Radio Access (E-UTRA); LTE Positioning Protocol (LPP) (Release 14)", 3GPP TS 36.355 V14.4.0, Dec. 2017, 168 pgs.

Ericsson, "Assistance Information Broadcasting", R3-174821, 3GPP TSG-RAN WG# Meeting #98, Reno, NV, USA, Nov. 27-Dec. 1, 2017, whole document (24 pages).

* cited by examiner (Solution A)

(Solution B)

| IE/Group Name | Presence | Range | IE Type and Reference | Semantics Description |
|---|---|---|---|---|
| Rank | O | | INTEGER (1..32) | Relative level of importance compared to other assistance data. Values are in decreasing order of importance, i.e., 1 is highest importance and 32 is lowest importance. |
| Concurrent Broadcast ID | O | | BIT STRING (4) | Assistance Data having the same *Concurrent Broadcast ID* value should be broadcast concurrently. |

FIG. 5

RANKING AND GROUPING POSITIONING ASSISTANCE DATA FOR BROADCAST

CROSS-REFERENCE TO RELATED APPLICATIONS

This application is a divisional application of U.S. patent Ser. No. 15/897,631, filed on Feb. 15, 2018, the disclosure of which is hereby incorporated by reference in its entirety.

TECHNICAL FIELD

This invention relates generally to wireless communications and, more specifically, relates to positioning assistance data for broadcast.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

A work item called "UE Positioning Accuracy Enhancements for LTE" has been approved for 3GPP Rel-15. See Nokia, Nokia Shanghai Bell, "WID Update: UE Positioning Accuracy Enhancements for LTE", RP-172313, 3GPP TSG RAN Meeting #78, Lisbon, Portugal, 18-21 Dec. 2017. One of the main objectives of the work item is broadcasting of positioning assistance data using the LTE system information broadcast mechanism. This requires new LPPa (LTE Positioning Protocol "a") procedure(s) to convey the assistance data from an E-SMLC to an eNB, and to trigger the broadcasting of the assistance data over the air interface in System Information Blocks (SIBs).

Multiple SIBs are expected to be defined for the assistance data, as follows.

1) Different SIBs for different positioning methods (e.g., RTK, GNSS, OTDOA).

2) For a given positioning method, different SIBs for different "parts" of the assistance data. For example, some data may need to be refreshed more frequently, or needed only for extremely accurate positioning, and the like.

Some SIBs are expected to be very large due to the size of the assistance data defined for the SIB, thus segmentation will likely be needed due to message size limitations in the radio protocol (RRC). That is, while SIB messages themselves might be not be able to be segmented, the content broadcast in SIB messages can be segmented (i.e., application-level segmentation and not RRC layer segmentation).

There are multiple different options, described below, for handling and sending these SIBs, but these options could be improved.

BRIEF SUMMARY

This section is intended to include examples and is not intended to be limiting.

In an exemplary embodiment, a method is disclosed that includes determining by a network node positioning assistance data blocks to be requested by the network node to be broadcasted by a base station to a user equipment for use by the user equipment in calculating a position of the user equipment. The method includes sending by the network node an assistance data broadcast request message toward the base station with positioning assistance data blocks and corresponding information, the information indicating to the base station that the base station is to admit or not admit for broadcasting one or more of the positioning assistance data blocks in response to insufficient resources at the base station to broadcast all the positioning assistance data blocks in the assistance data broadcast request message. The method also includes receiving, at the network node and from the base station, indications of success or failure by the base station of broadcasting the positioning assistance data blocks, the success or failure based on the base station's admitting or not admitting, respectively, the positioning assistance data blocks.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: determining by a network node positioning assistance data blocks to be requested by the network node to be broadcasted by a base station to a user equipment for use by the user equipment in calculating a position of the user equipment; sending by the network node an assistance data broadcast request message toward the base station with positioning assistance data blocks and corresponding information, the information indicating to the base station that the base station is to admit or not admit for broadcasting one or more of the positioning assistance data blocks in response to insufficient resources at the base station to broadcast all the positioning assistance data blocks in the assistance data broadcast request message; and receiving, at the network node and from the base station, indications of success or failure by the base station of broadcasting the positioning assistance data blocks, the success or failure based on the base station's admitting or not admitting, respectively, the positioning assistance data blocks.

An exemplary computer program product includes a computer-readable storage medium bearing computer program code embodied therein for use with a computer. The computer program code includes: code for determining by a network node positioning assistance data blocks to be requested by the network node to be broadcasted by a base station to a user equipment for use by the user equipment in calculating a position of the user equipment; code for sending by the network node an assistance data broadcast request message toward the base station with positioning assistance data blocks and corresponding information, the information indicating to the base station that the base station is to admit or not admit for broadcasting one or more of the positioning assistance data blocks in response to insufficient resources at the base station to broadcast all the positioning assistance data blocks in the assistance data broadcast request message; and code for receiving, at the network node and from the base station, indications of success or failure by the base station of broadcasting the positioning assistance data blocks, the success or failure based on the base station's admitting or not admitting, respectively, the positioning assistance data blocks.

A further exemplary embodiment is an apparatus comprising means for performing: determining by a network node positioning assistance data blocks to be requested by the network node to be broadcasted by a base station to a user equipment for use by the user equipment in calculating a position of the user equipment; sending by the network node an assistance data broadcast request message toward the base station with positioning assistance data blocks and corresponding information, the information indicating to the base station that the base station is to admit or not admit for broadcasting one or more of the positioning assistance data blocks in response to insufficient resources at the base station to broadcast all the positioning assistance data blocks in the assistance data broadcast request message; and receiving, at the network node and from the base station, indications of success or failure by the base station of broadcasting the positioning assistance data blocks, the success or failure based on the base station's admitting or not admitting, respectively, the positioning assistance data blocks.

Another exemplary embodiment is a method including determining resources available to broadcast the received positioning assistance data blocks toward the user equipment, and determining which individual ones of the received positioning assistance data blocks should be admitted or not admitted for broadcast. The method includes broadcasting, by the base station and toward the user equipment, the admitted ones of the received positioning assistance data blocks using corresponding system information blocks. The method also includes not broadcasting, by the base station, the not admitted ones of the received positioning assistance data blocks. The method further includes sending, by the base station and toward the network node, indications of success or failure by the base station of broadcasting the positioning assistance data blocks, the success or failure based on admitting or not admitting, respectively, of the positioning assistance data blocks.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: receiving, at a base station and from a network node, an assistance data broadcast request message with positioning assistance data blocks and corresponding information, the information indicating to the base station that the base station is to admit or not admit for broadcasting one or more of the positioning assistance data blocks in response to insufficient resources at the base station to broadcast all the positioning assistance data blocks in the assistance data broadcast request message, and wherein the positioning assistance data block is to be broadcast to a user equipment for use by the user equipment in calculating a position of the user equipment; determining resources available to broadcast the received positioning assistance data blocks toward the user equipment; determining which individual ones of the received positioning assistance data blocks should be admitted or not admitted for broadcast; broadcasting, by the base station and toward the user equipment, the admitted ones of the received positioning assistance data blocks using corresponding system information blocks; not broadcasting, by the base station, the not admitted ones of the received positioning assistance data blocks; and sending, by the base station and toward the network node, indications of success or failure by the base station of broadcasting the positioning assistance data blocks, the success or failure based on admitting or not admitting, respectively, of the positioning assistance data blocks.

An exemplary computer program product includes a computer-readable storage medium bearing computer program code embodied therein for use with a computer. The computer program code includes: code for receiving, at a base station and from a network node, an assistance data broadcast request message with positioning assistance data blocks and corresponding information, the information indicating to the base station that the base station is to admit or not admit for broadcasting one or more of the positioning assistance data blocks in response to insufficient resources at the base station to broadcast all the positioning assistance data blocks in the assistance data broadcast request message, and wherein the positioning assistance data block is to be broadcast to a user equipment for use by the user equipment in calculating a position of the user equipment; code for determining resources available to broadcast the received positioning assistance data blocks toward the user equipment; code for determining which individual ones of the received positioning assistance data blocks should be admitted or not admitted for broadcast; code for broadcasting, by the base station and toward the user equipment, the admitted ones of the received positioning assistance data blocks using corresponding system information blocks; code for not broadcasting, by the base station, the not admitted ones of the received positioning assistance data blocks; and code for sending, by the base station and toward the network node, indications of success or failure by the base station of broadcasting the positioning assistance data blocks, the success or failure based on admitting or not admitting, respectively, of the positioning assistance data blocks.

An additional exemplary embodiment is an apparatus comprising means for performing: receiving, at a base station and from a network node, an assistance data broadcast request message with positioning assistance data blocks and corresponding information, the information indicating to the base station that the base station is to admit or not admit for broadcasting one or more of the positioning assistance data blocks in response to insufficient resources at the base station to broadcast all the positioning assistance data blocks in the assistance data broadcast request message, and wherein the positioning assistance data block is to be broadcast to a user equipment for use by the user equipment in calculating a position of the user equipment; determining resources available to broadcast the received positioning assistance data blocks toward the user equipment; determining which individual ones of the received positioning assistance data blocks should be admitted or not admitted for broadcast; broadcasting, by the base station and toward the user equipment, the admitted ones of the received positioning assistance data blocks using corresponding system information blocks; not broadcasting, by the base station, the not admitted ones of the received positioning assistance data blocks; and sending, by the base station and toward the network node, indications of success or failure by the base station of broadcasting the positioning assistance data blocks, the success or failure based on admitting or not admitting, respectively, of the positioning assistance data blocks.

BRIEF DESCRIPTION OF THE DRAWINGS

In the attached Drawing Figures:

FIG. 5 is a table of possible information elements and their associated information, in accordance with exemplary embodiments;

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for ranking and grouping positioning assistance data for broadcast. Additional description of these techniques is presented after a system into which the exemplary embodiments may be used is described.

Figure 1:
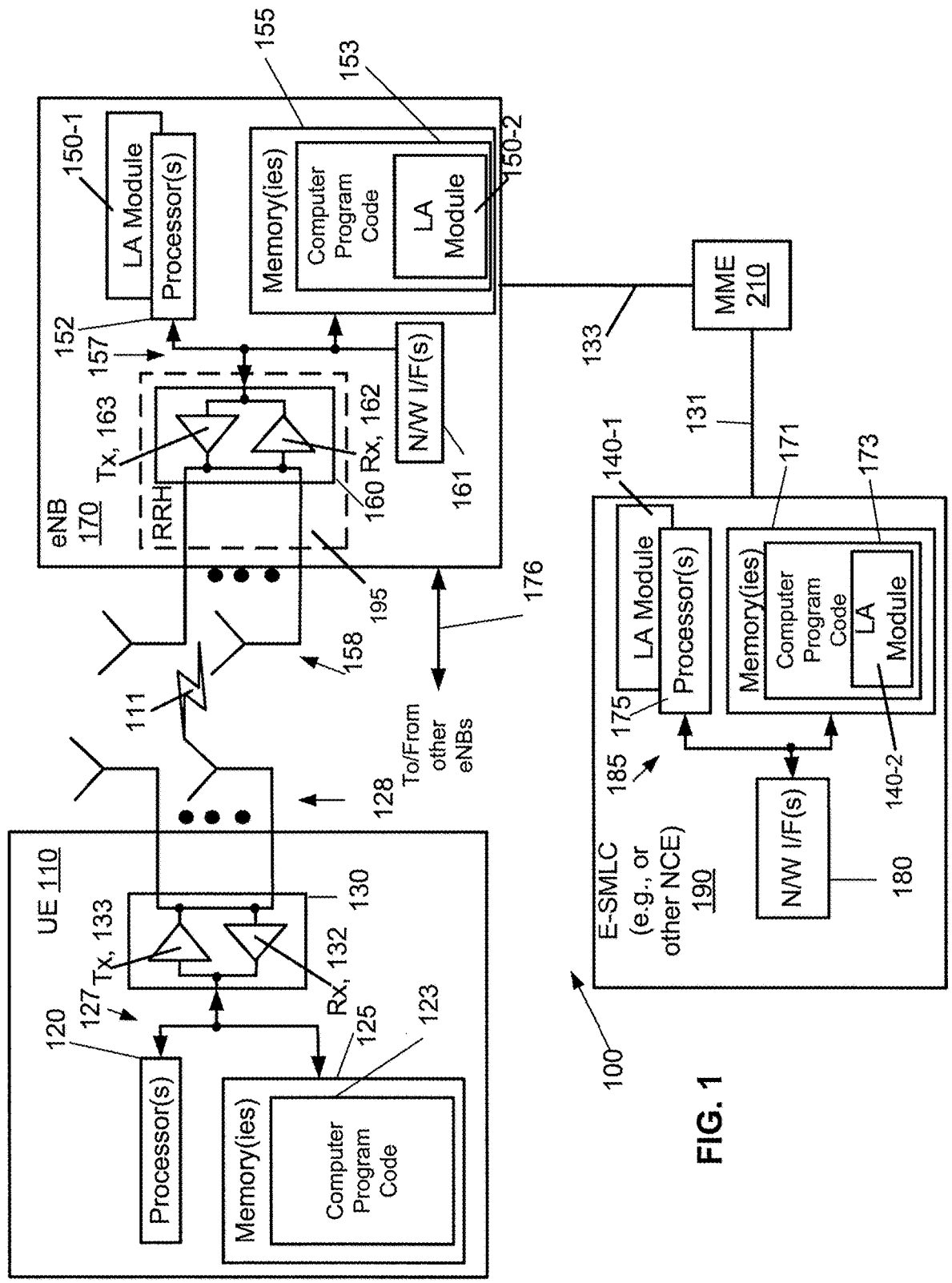
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a location assistance (LA) module 150, comprising one of or both parts 150-1 and/or 150-2, which may be implemented in a number of ways. The LA module 150 may be implemented in hardware as LA module 150-1, such as being implemented as part of the one or more processors 152. The LA module 150-1 may be implemented also as an integrated circuit or through other hardware such as a programmable gate array. In another example, the LA module 150 may be implemented as LA module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 133. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include an evolved serving mobile location center (E-SMLC) 190 (e.g., may include the functionality of the same), or may include (or the wireless network 100 may include) other network control elements (NCEs) including additional functionality such as MME (Mobility Management Entity)/SGW (Serving Gateway)

functionality, and which provides connectivity with a further network, such as a telephone network and/or a data communications network (e.g., the Internet). The eNB 170 is coupled to the E-SMLC 190 via the MME 210 and links 133 and 131. The LPPa is an end-to-end protocol between the eNB 170 and E-SMLC 190. LPPa protocol data units are transported through the MME 210 and across two interfaces (SLs and S1). For additional details regarding communications between the E-SMLC 190, the eNB 170 and the UE 110, see 3GPP TS 36.305 V14.3.0 (2017 September). For instance, see section 6.5, "Signaling between an E-SMLC and eNode B".

The E-SMLC 190 includes one or more processors 175, one or more memories 171, and one or more network interfaces (N/W I/F(s)) 180, interconnected through one or more buses 185. The one or more memories 171 include computer program code 173. The E-SMLC 190 includes a location assistance (LA) module 140, comprising one of or both parts 140-1 and/or 140-2, which may be implemented in a number of ways. The LA module 140 may be implemented in hardware as LA module 140-1, such as being implemented as part of the one or more processors 175. The LA module 140-1 may be implemented also as an integrated circuit or through other hardware such as a programmable gate array. In another example, the LA module 140 may be implemented as LA module 140-2, which is implemented as computer program code 173 and is executed by the one or more processors 175. For instance, the one or more memories 171 and the computer program code 173 are configured to, with the one or more processors 175, cause the E-SMLC 190 to perform one or more of the operations as described herein.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

Having thus introduced one suitable but non-limiting technical context for the practice of the exemplary embodiments of this invention, the exemplary embodiments will now be described with greater specificity.

As introduced above, there are multiple different options for handling and sending SIBs. Two different solutions for the LTE Positioning Protocol "a" (LPPa) signaling framework have been proposed in 3GPP RAN3. They are described in sections 2.1 and 2.2 of R3-174354. See Nokia, Nokia Shanghai Bell, "LPPa signaling framework for assistance data broadcast", R3-174354, 3GPP TSG-RAN WG3 Meeting #98, Reno, Nev., USA, 27 Nov.-1 Dec. 2017. These solutions can be briefly summarized as follows.

Figure 2:
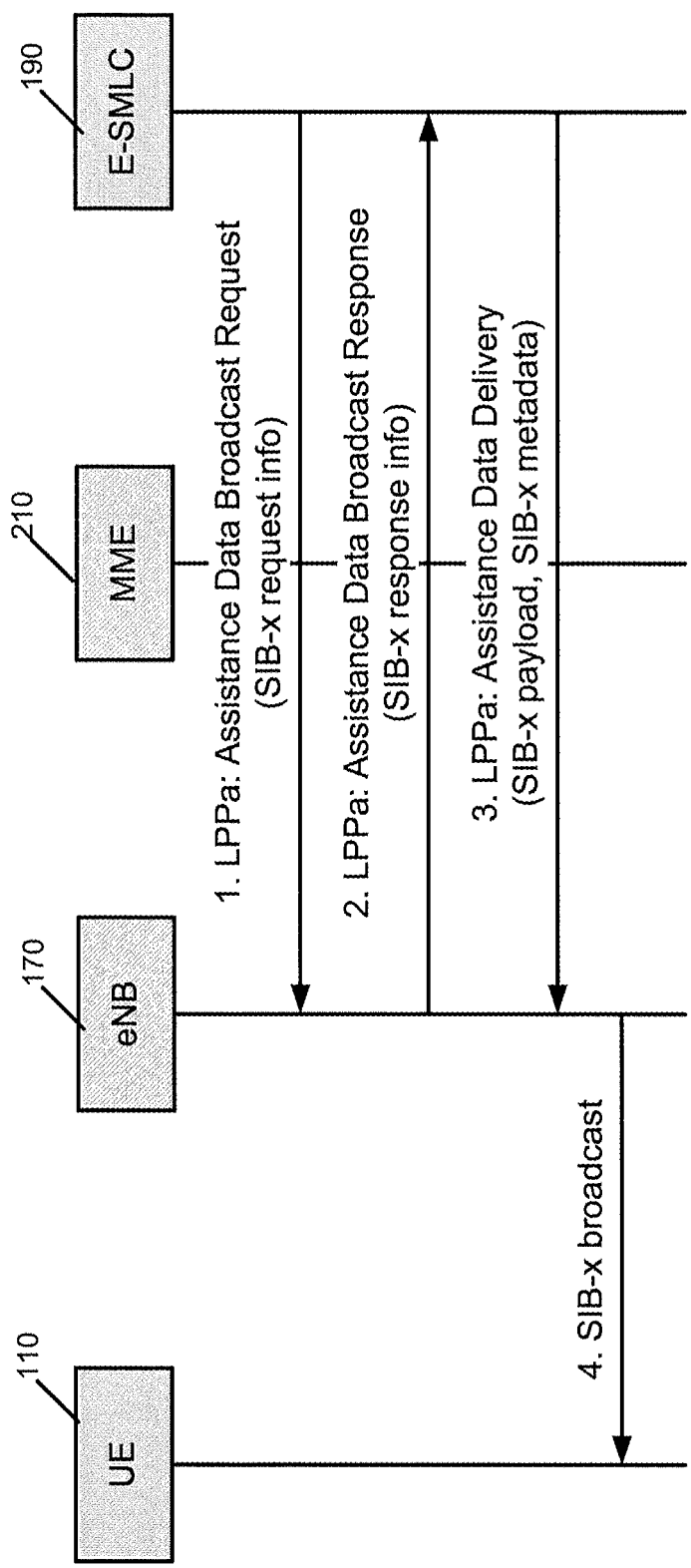
FIG. 2 is a signaling diagram for a first solution ("Solution A") for the LTE Positioning Protocol "a" (LPPa) signaling framework for handling and sending assistance data for broadcasting through SIBs, and this comprises two new LPPa procedures.

Turning to FIG. 2, this figure is a signaling diagram for a first solution ("Solution A") for the LTE Positioning Protocol "a" (LPPa) signaling framework for handling and sending assistance data for broadcasting through SIBs, and this comprises two new LPPa procedures. The UE 110, eNB 170, an MME 210, and an E-SMLC 190 are shown. In this solution, there is a "pre-negotiation", requiring two new LPPa procedures (class 1 and class 2). The E-SMLC 190 first "negotiates" the amount of SIB resources available at eNB(s) using the class 1 procedure. See step 1, "LPPa: Assistance Data Broadcast Request (SIB-x request info)", which is a signaling of a message to start negotiation of the amount of SIB resources. In step 2, the eNB 170 responds with "LPPa: Assistance Data Broadcast Response (SIB-x response info)", which is signaling of a message to complete the negotiation.

The E-SMLC 190 then conveys appropriately sized assistance data using the class 2 procedure. See step 3, "2. LPPa: Assistance Data Broadcast Response (SIB-x response info)". The eNB 170 then communicates in step 4 a "SIB-X broadcast" message in signaling to the UE 110.

Figure 3:
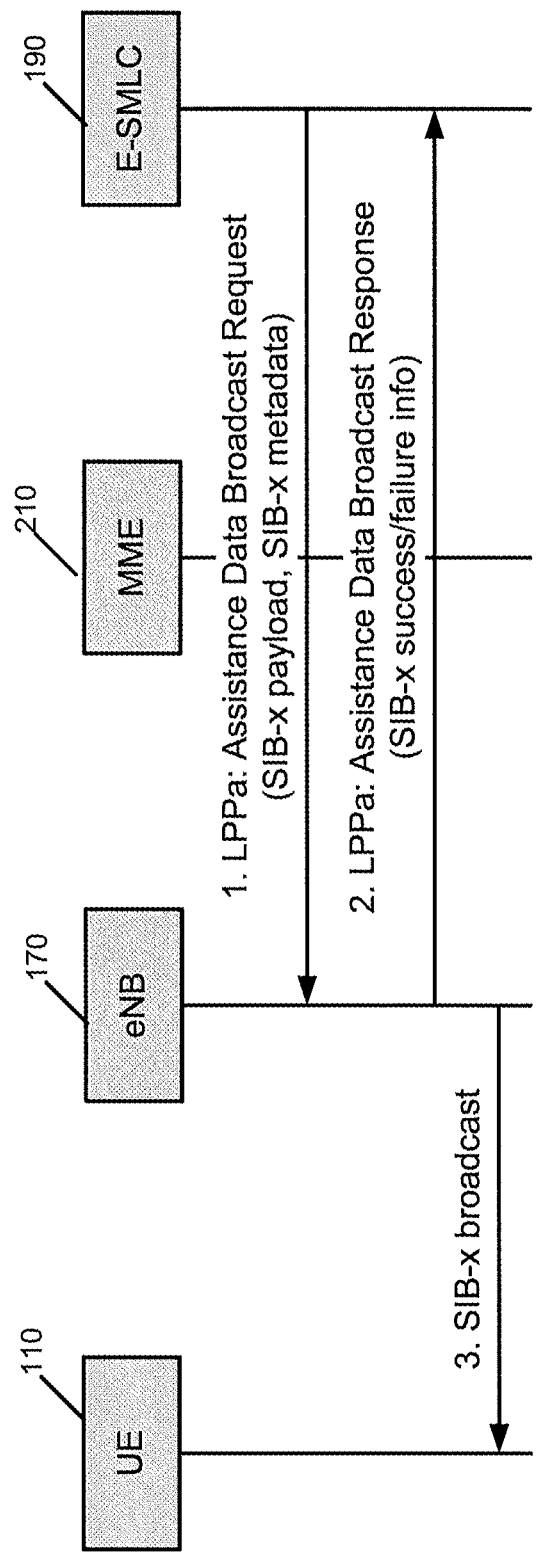
FIG. 3 is a signaling diagram for a second solution ("Solution B") for the LTE Positioning Protocol "a" (LPPa) signaling framework for handling and sending assistance data for broadcasting SIBs, and this comprises a single new LPPa procedure.

Referring to FIG. 3, this is a signaling diagram for a second solution ("Solution B") for the LTE Positioning Protocol "a" (LPPa) signaling framework for handling and sending assistance data for broadcast through SIBs, and this comprises a single new LPPa procedure. This solution has a "pre-configuration", requiring one new LPPa procedure (class 1). The E-SMLC 190 conveys assistance data that is appropriately sized based on pre-configuration. An assumption is that the operator deploys the service in a wide area with pre-configured amount of SIB resources. Thus, in step 1, the E-SMLC 190 signals a message of "1. LPPa: Assistance Data Broadcast Request (SIB-x payload, SIB-x metadata)". The eNB 170 responds in step 2 with a message "2. LPPa: Assistance Data Broadcast Response (SIB-x success/failure info)". The eNB 170 sends (step 3) a "SIB-x broadcast" message toward the UE 110.

Regardless of the solution, there is a common understanding that the eNB shall not need to "understand" the information the eNB is requested to broadcast, and in fact the information is encoded over LPPa as OCTET STRING that cannot be interpreted by the eNB. It is the E-SMLC that "understands" the data, and the eNB simply broadcasts what the eNB sees only as blocks of bits.

As discussed in section 2.3 of R3-174354, one preference is Solution B, which addresses the known requirements of assistance data broadcast without unnecessary complexity/over-engineering. However, one potential drawback of Solution B that has been identified by proponents of Solution A is the handling of failure cases (e.g., insufficient radio resources/insufficient system information broadcast capacity).

In some operator deployments, the system may simultaneously broadcast assistance data for multiple positioning methods (e.g., RTK, GNSS, and/or OTDOA). This results in many different SIBs being broadcast concurrently (i.e., one or more SIBs per positioning method). However, situations can arise where the eNB is unable to broadcast all that is requested by the E-SMLC, e.g., due to insufficient system information broadcast capacity. In such situations, the eNB 170 may only be able to broadcast a subset of what is requested by the E-SMLC. A question that remains, therefore, is how this situation should be addressed.

In Solution A, this problem is addressed through "pre-negotiation", where E-SMLC gets feedback from eNBs regarding available radio resources for the service (e.g., available radio resources for system information broadcast of positioning assistance data) and then E-SMLC decides which SIB's assistance data content or payload to send to the eNB (based on its knowledge of the service and SIB content). However, there are significant drawbacks:

a) It requires an E-SMLC to have radio resource knowledge of individual eNBs.

b) It does not address the case where radio resources become insufficient during an ongoing broadcast.

In Solution B, Ericsson proposes in R3-174800 that the eNB report which part(s) of the assistance data it was unable to configure for broadcasting. See Ericsson, "Assistance Information Broadcast Procedure in LPPa", R3-174800, 3GPP TSG-RAN WG3 #98, Reno, Nev., USA, 27 Nov.-1 Dec. 2017. However, this also has significant drawbacks:

a) Ericsson does not disclose how the eNB determines which part of the assistance data to broadcast and not broadcast. As stated above, the assistance data is transparent to the eNB.

b) Then, presumably the eNB simply drops some of the data and reports this to the E-SMLC, which then makes a new request that may better suit the eNB's available system information broadcast capacity (i.e., "trial and error").

Another possible technique for addressing situations where the eNB is unable to broadcast all that is requested by the E-SMLC is as follows. There is a mechanism called "Allocation and Retention Priority" (ARP) in LTE. See section 13.2 of 3GPP TS 36.300 (e.g., 3GPP TS 36.300 V15.0.0 (2017 December)), and sections 8.2.1.2 & 9.2.1.60 of 3GPP TS 36.413 (see, e.g., 3GPP TS 36.413 V15.0.0 (2017 December)). This mechanism is described as follows:

"Allocation and Retention Priority (ARP): the primary purpose of ARP is to decide whether a bearer establishment/modification request can be accepted or needs to be rejected in case of resource limitations. In addition, the ARP can be used by the eNodeB to decide which bearer(s) to drop during exceptional resource limitations (e.g. at handover)."

However, this has E-RAB level granularity (i.e., applicable only to UE-specific E-RABs) and does not support setting of ARP values for combinations of E-RABs.

To address these issues and as an overview, in an exemplary embodiment herein, when the E-SMLC 190 sends a list of positioning assistance data (corresponding to SIBs) to the eNB 170 to be broadcast by the eNB 170 for use by the UE (or UEs) 110, the E-SMLC 190 provides additional information to enable the eNB 170 to determine which positioning assistance data to "admit" (e.g., allocate resources and broadcast) and which positioning assistance data to "not admit" (e.g., not allocate resources and not broadcast) in response to the eNB 170 having insufficient system information broadcast resources to broadcast SIBs corresponding to all of the positioning assistance data in the list.

For each one of the positioning assistance data, the E-SMLC provides to the eNB in an exemplary embodiment at least the following:

1) Rank: Relative level of importance compared to other assistance data. Values may be, e.g., in decreasing order of importance, e.g., 1 (one) might be the highest importance and 32 might be the lowest importance.

2) Concurrent Broadcast ID: SIBs (and their corresponding positioning assistance data) having Concurrent Broadcast ID value X should be broadcast concurrently with other SIBs (and their corresponding positioning assistance data) having Concurrent Broadcast ID value X which have the same or higher rank (e.g., or in other examples regardless of rank or based on some other implementation-dependent methods). This enables "grouping" of SIBs (and their corresponding positioning assistance data), which should be treated atomically when it comes to "admitting" (or "not admitting") SIBs and their corresponding positioning assistance data. A SIB (and its corresponding positioning assistance data) could have more than one Concurrent Broadcast ID value.

As described below, it is also possible to provide the Rank without the Concurrent Broadcast ID. It should be noted that Rank and Concurrent Broadcast ID could potentially be signaled at a finer granularity than SIB (e.g., per IE or group of IEs within a SIB). This may not be necessary, and may also depend on 3GPP RAN2 decision about how assistance data is mapped to SIBs, but is another possible exemplary implementation.

Then, when there are insufficient resources for system information broadcast, the eNB 170 takes into account the Rank and/or Concurrent Broadcast ID to determine which positioning assistance data to "admit" (e.g., allocate resources and broadcast) and which positioning assistance data to "not admit" (e.g., not allocate resources and not broadcast). The following are possible techniques for using this information:

1) The eNB 170 does not admit the SIB(s) that have the lowest Rank value (e.g., such SIBs are "not admitted").

2) For a given Rank value, SIB(s) having the same Concurrent Broadcast ID should be "admitted" or "not-admitted" as a group.

Now that an overview has been provided, additional detail is provided. It is helpful at this point to describe some terminology being used. The E-SMLC 190 sends positioning assistance data to eNB 170 and the eNB broadcasts this data via SIBs. To be precise, the positioning assistance data is for UEs to use but this data is sent to the eNB for broadcasting purposes. SIBs are system information blocks which are blocks of data that are mapped to a System Information message and it is the System Information message that is broadcast by the eNB. An SI message is an RRC protocol message. SIB and SI messages can be synonymous for the description herein.

It is expected that the E-SMLC 190 will have/include some sort of metadata (see, e.g., SIB-x metadata 430, described below) to indicate what type of information is in the positioning assistance data OCTET STRING, e.g., "this is OTDOA data" or "this is SIB-x data". This metadata information helps the eNB determine which SIB is for that data. It is expected that the eNB will be able to determine the specific SIB to use for specific type of data. The eNB 170 just needs some indication of the type of positioning assistance data to map that data to a specific SIB. While these are the expectations, the instant exemplary embodiments can be modified to implement other realizations. For example, the E-SMLC 190 could send an indication of a SIB to use for an enclosed positioning assistance data.

The term "positioning assistance data" (also referred to as "assistance data") refers to different data depending on the positioning method involved. In LTE, currently assistance data can be signaled from E-SMLC to UE using only dedicated signaling with the LPP protocol. 3GPP TS 36.355 (see, e.g., 3GPP TS 36.355 V14.4.0 (2017 December)) has procedures and messages defined for dedicated transfer of assistance data. With the new work item for Rel-15, there might be introduction of broadcasting of assistance data. While there is no definition in 3GPP TS 36.355 or 3GPP TS 36.305, the term "positioning assistance data" (or "assistance data") is basically information provided to the UE to assist the UE in performing some measurement or some information that helps the UE receive certain signals or acquire satellite signals or some information that the UE uses in the process of calculating UE position. From the context of different sections in 3GPP TS 36.355, the term assistance data is quite clear. For the purpose of this disclosure, whatever is the assistance data, it is broadcast using a set of SIBs, and how lack of resources to broadcast all SIBs is what is addressed by the exemplary embodiments herein. Note also, as described above, SI (e.g., SIB) messages might not be able to be segmented. However, the content broadcast in SI (e.g., SIB) messages can be segmented (i.e., application level segmentation and not RRC layer segmentation). It is therefore expected that a SIB-x payload 420 will fit a SIB. This is one reason why different payloads may be sent for different types of assistance data.

Figure 4:
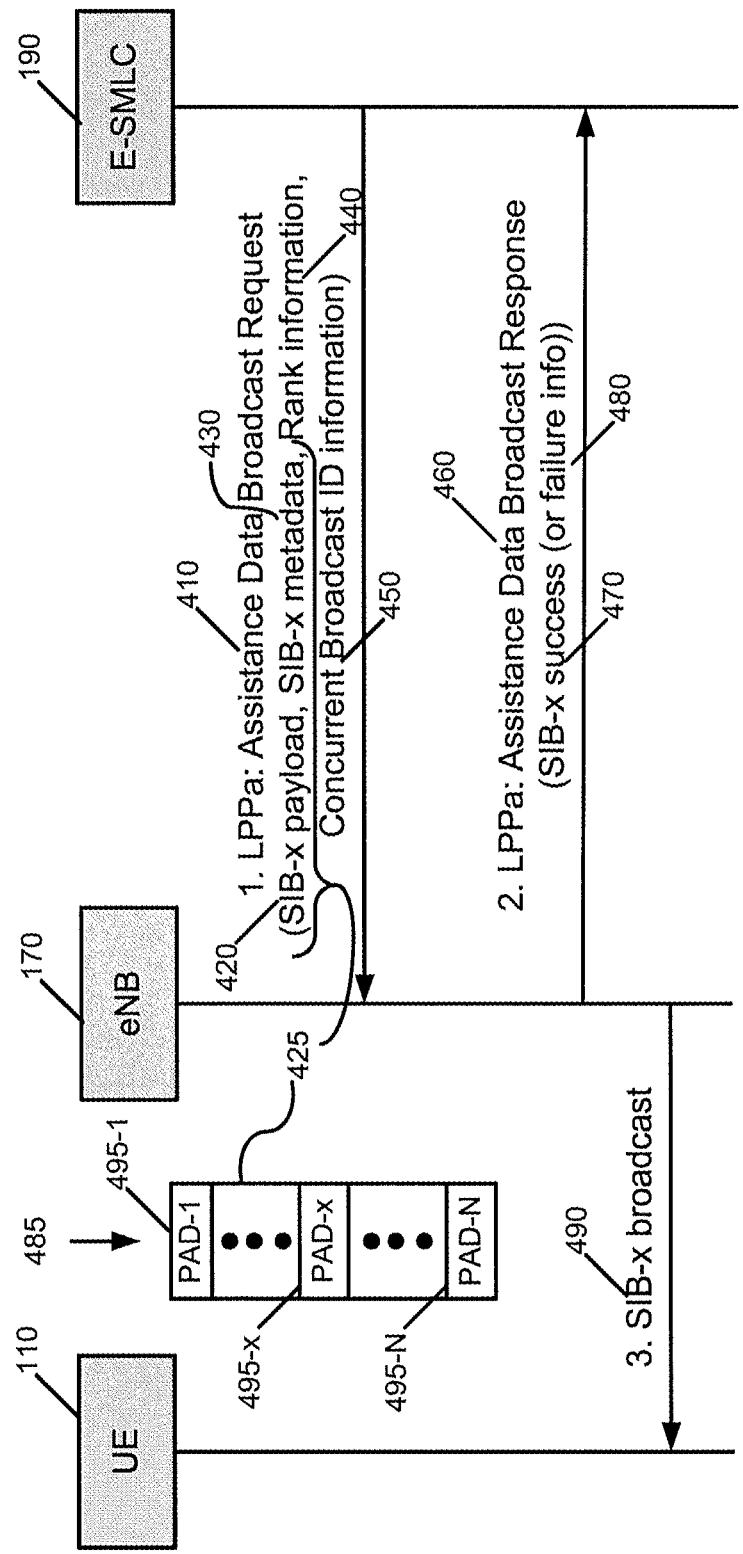
FIG. 4 is a signaling diagram for an assistance data broadcast procedure and corresponding SIB broadcast in accordance with an exemplary embodiment.

Referring to FIG. 4, this figure is a signaling diagram for an assistance data broadcast procedure and corresponding SIB broadcast in accordance with an exemplary embodiment. Steps 1 and 2 of FIG. 4 are the assistance data broadcast procedure, which allows the E-SMLC 190 to request the eNB 170 to broadcast positioning assistance data.

In step 1, the E-SMLC 190 sends, as part of an LPPa signaling and to initiate the procedure, an Assistance Data Broadcast Request message 410. This message comprises SIB-x payload 420, SIB-x metadata 430, SIB-x Rank information 440, and SIB-x Concurrent Broadcast ID information 450. It is expected that this message can address one or multiple pieces of assistance data. Positioning assistance data blocks 425 comprise (in this example) the SIB-x payload 420. The SIB-x metadata 430 is any information associated with the SIB-x payload 420 that is not the actual payload itself. Thus, Rank information 440 and Concurrent Broadcast ID information 450 is part of the metadata 430, as is other information not relevant to this disclosure. For ease of reference, the Rank information 440 and Concurrent Broadcast ID information 450 are shown separately from the SIB-x metadata 430, but could be included therein. In this example, the SIB-x indicates that a particular SIB might be used for sending these positioning assistance data blocks 425. More specifically, SIBs are numbered 1, 2, and so on. Currently in LTE there are 22 SIBs that have been specified. It is expected multiple new SIBs will be specified to carry the positioning assistance data. These could be SIB23, SIB24, and the like. Therefore, SIB-x is a generic notation to indicate new SIBs whose numbers are not exactly known now, but should be known at some point.

It is noted that the terms "SIB" and "positioning assistance data" (or "assistance data") are sometimes used interchangeably herein. This is because if SIBs are assigned to carry specific positioning assistance data, then the positioning assistance data and the SIBs carrying that data can be considered to be the same.

One possibility for sending positioning assistance data blocks 425 is a list 485 in the message 410. The list 485 comprises a number N of entries 495-1 through 495-N, of which entry 495-x is one of them. Each entry 495 corresponds to positioning assistance data (PAD) (i.e., PAD-1 in entry 495-1 through PAD-x in entry 495-x, and then though and until PAD-N in entry 495-N). Each entry 495 would contain the SIB-x payload 420 and the SIB-x metadata 430, in an exemplary embodiment, and PAD-x in entry 495-x corresponds to a single positioning assistance data block 425 illustrated in FIG. 4. The E-SMLC 190 sends positioning assistance data to the eNB 170, and the eNB 170 determines the SIB (e.g., SIB-x or possibly multiple SIBs, e.g., each SIB for a different type of positioning assistance data) to use for broadcast. It is assumed that the Assistance Data Broadcast Request message 410 would contain the list 485, but multiple ones of the Assistance Data Broadcast Request messages 410 could be used to create a list 485.

If resources are available to initiate broadcast of some or all of the positioning assistance data blocks 425, the eNB 170 replies with the Assistance Data Broadcast Response message 460 in step 2, and with the SIB-x success information 470. The example of FIG. 4 assumes resources are available to initiate broadcast of some or all of the assistance data, and therefore the eNB 170 in step 3 sends a SIB-x broadcast message 490 to the UE 110.

However, if insufficient resources are available to broadcast all of the assistance data, the eNB may take into account the Rank information 440 and/or Concurrent Broadcast ID information 450, if present, when configuring broadcasting. The eNB 170 reports success or failure of the broadcasting to the E-SMLC 190 using the SIB-x success information 470 and/or SIB-x failure information 480, respectively.

If resources are not available to initiate broadcast of any of the assistance data, the eNB replies with an Assistance Data Broadcast Failure message. This message is not shown, since FIG. 4 assumes resources are available to initiate broadcast of some or all of the assistance data.

FIG. 5 illustrates one possible way the Rank information 440 and the Concurrent Broadcast ID information 450 may be included in a message from the E-SMLC 190 to the eNB 170 for an Assistance Data Broadcast Request message 410 or other suitable message. FIG. 5 is a table of possible information elements (IEs) and their associated information, in accordance with exemplary embodiments. This table may itself be an I.E., called an admission parameters IE 500 in an exemplary embodiment. The admission parameters IE 500 provides the parameters used by the eNB to determine whether to fail (e.g., or terminate) the concerned SIB in case of insufficient resources. If the Admission Parameters IE 500 is included in the Broadcast Request message, the eNB should take this IE into account when determining whether to fail (e.g., or terminate) the concerned SIB in case of insufficient resources. The Admission Parameters IE comprises (in this example) one or both of the IEs 510 and/or 520.

The example of FIG. 5 assumes these are both explicit, but this is not necessary. That is, in some embodiments, one or both of the rank information (as illustrated in Rank IE 510) or group information (as illustrated by Concurrent Broadcast IE 520) may be implicit and not explicit. For instance, rank may be implicit based on ordering of messages. Thus highest priority blocks are sent in a first assistance data request message, second highest priority blocks in a second assistance data message, and the like, and the eNB 170 would then broadcast the blocks based on the implicit ranking. Alternatively or additionally, the group information could be implicit such that all assistance data blocks listed in a same assistance data broadcast request message are implicitly in the same group, a different assistance data broadcast request message would have assistance data blocks for a different group, and the like.

In FIG. 5, two information elements (IEs) 510 and 520 are shown in a table. The Rank IE 510 has an optional (O) presence, no range is listed, the IE type and reference is listed as INTEGER with a reference range of 1 to 32, "(1 . . . 32)", and the semantics description is the following: "Relative level of importance compared to other assistance data. Values may be, e.g., in decreasing order of importance, i.e., 1 is highest importance and 32 is lowest importance." The Concurrent Broadcast ID IE 520 has an optional (O) presence, no range is listed, the IE type and reference is listed as BIT STRINGS with a reference range of 4 bits, and the semantics description is the following: "Assistance Data having the same Concurrent Broadcast ID value should be broadcast concurrently." Depending on implementation, there can be a list of Concurrent Broadcast IDs or only one ID, per SIB. Regarding the term "concurrently", the point is that all SIBs in the same group need to be broadcast as one group. If there are not sufficient resources to broadcast some SIBs in a group, then all SIBs in the group are not broadcast. No partial set of SIBs in one group is broadcast if there no sufficient resources.

Figure 6:
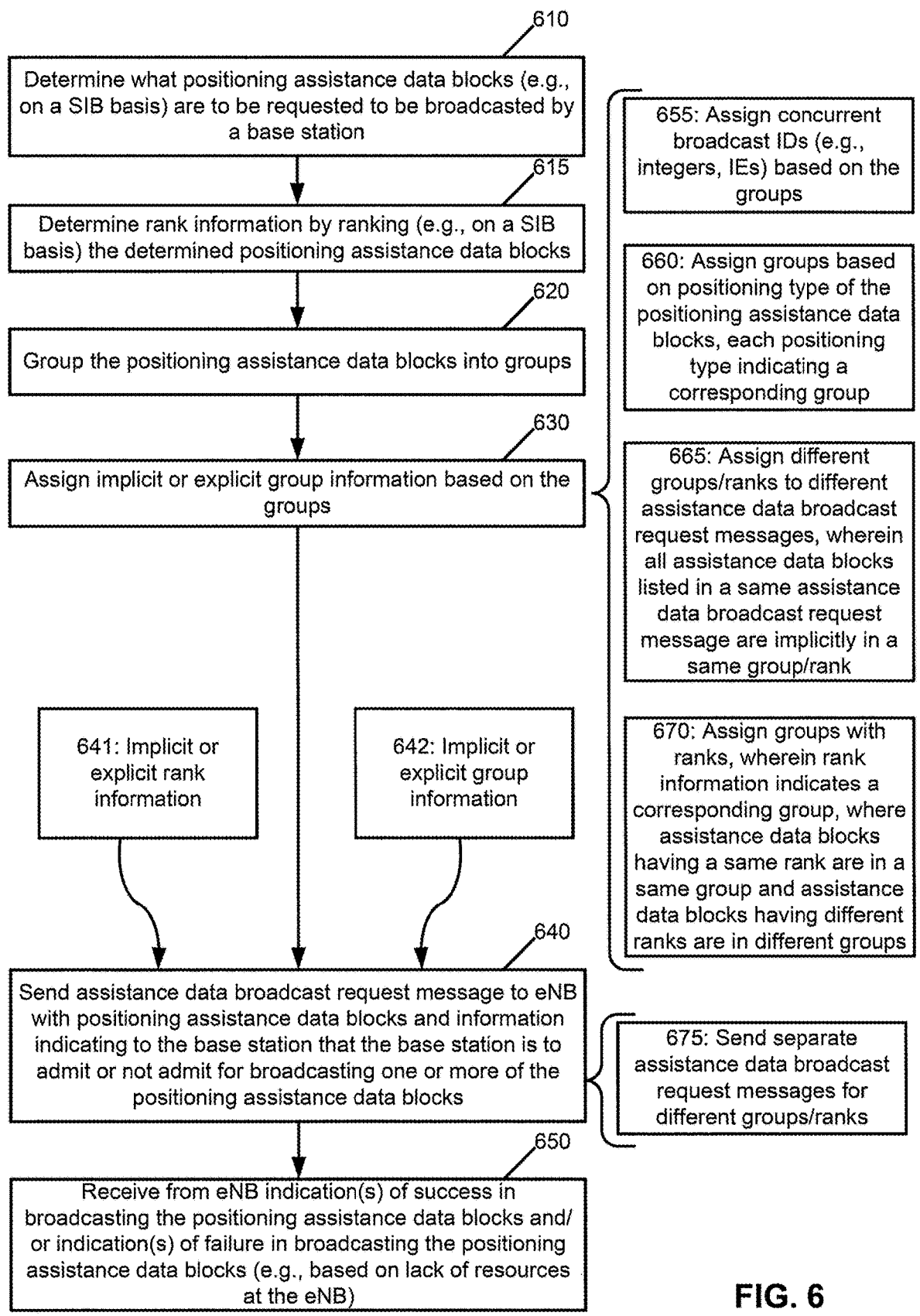
FIG. 6 is a logic flow diagram performed by a network node such as an E-SMLC for ranking and grouping positioning assistance data blocks for broadcast, and illustrates the operation of an exemplary method or methods, a result of execution of computer program instructions embodied on a computer readable memory, functions performed by logic implemented in hardware, and/or interconnected means for performing functions in accordance with exemplary embodiments.

Turning to FIG. 6, this figure is a logic flow diagram performed by a network node such as an E-SMLC for ranking and grouping positioning assistance data blocks 425 for broadcast. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the LA module 140 may include multiples ones of the blocks in FIG. 6, where each included block is an interconnected means for performing the function in the block. The blocks in FIG. 6 are assumed to be performed by the E-SMLC 190 (or other network node, depending on system and implementation), e.g., under control of the LA module 140 at least in part.

In block 610, the E-SMLC 190 determines what positioning assistance data blocks 425 (e.g., on a SIB basis) are to be requested to be broadcasted by a base station. The E-SMLC 190 in block 615 determines rank information (e.g., on a SIB basis) by ranking the determined positioning assistance data blocks 425. In block 620, the E-SMLC 190 groups the positioning assistance data blocks 425 into groups.

In block 630, the E-SMLC 190 assigns implicit or explicit group information based on the groups. There may be multiple techniques for how different assistance data blocks are grouped. Assistance data blocks for different positioning methods, e.g., OTDOA positioning, A-GNSS positioning, RTK GNSS positioning (different kinds of data therefore exist for these methods) may be grouped into independent SIB groups. Possibly, data for the same level of positioning accuracy may be grouped into independent SIB groups. Regardless of how the assistance data blocks (and possibly their corresponding SIBs) are grouped, as described above, SIBs having Concurrent Broadcast ID value X should be broadcast by the eNB concurrently with other SIBs having Concurrent Broadcast ID value X, or alternatively with other SIBs having Concurrent Broadcast ID value X which have the same or higher rank, and the E-SMLC 190 can group these SIBs accordingly and assign the ID values accordingly.

Examples of block 630 are illustrated by blocks 655, 660, 665, and 670. In block 655, Concurrent Broadcast IDs (e.g., in Concurrent Broadcast ID information 450 of FIG. 4) may be assigned based on the groups in block 655. The Concurrent Broadcast IDs may be, e.g., integers (e.g., each integer indicating a group) or IEs such as the Concurrent Broadcast ID information element 520 of FIG. 5, or possibly other indicators. The Concurrent Broadcast IDs are explicit group information, and would be sent along with the payload 420, e.g., in the metadata 430. In block 660, groups are based on positioning type of the positioning assistance data blocks, each positioning type indicating a corresponding group. The positioning type might be "A-GNSS" or "RTK". Positioning type may also have finer granularity corresponding to different RTK positioning methods, e.g., RTK type could be divided in to RTK MAC, RTK VRS, RTK FKP, and the like, which are all different RTK methods. The positioning type is considered to be implicit, as the positioning type also indicates the group, and there are no separate group indications. In block 665, different groups are assigned to different assistance data broadcast request messages, wherein all assistance data blocks listed in a same assistance data broadcast request message 410 are implicitly in a same group. That is, the E-SMLC 190 separates the groups into different messages 410. Block 665 may alternatively entail different ranks being assigned to different assistance data broadcast request messages, wherein all assistance data blocks listed in a same assistance data broadcast request message 410 are implicitly in a same rank. That is, the E-SMLC 190 separates the ranks into different messages 410. Note that at some point, such as in block 640, the E-SMLC 190 might communicate the use of implicit ranking or implicit grouping to the eNB 170 such that the eNB 170 would know that implicit ranking/grouping is being used. It should also be clear that E-SMLC may not communicate that implicit ranking/grouping is being used (e.g., if implicit ranking/grouping is the only method specified in a standard, then there is no need for E-SMLC to communicate that it is being used). In block 670, groups are assigned with ranks, wherein rank information indicates a corresponding group. That is, assistance data blocks having a same rank are in a same group and assistance data blocks having different ranks are in different groups.

The E-SMLC 190 in block 640 sends an assistance data broadcast request to the eNB 170 with positioning assistance data block(s) 425 (e.g., SIB-x payload(s) 420 in FIG. 4) and information indicating to the base station that the base station is to admit or not admit for broadcasting one or more of the positioning assistance data blocks. This information could be an indication that implicit ranking (see block 641) or grouping (see block 642) will be used (see also, e.g., blocks 665 and 675 below). This information could additionally or alternatively include (see block 641) corresponding rank information 440. The information could additionally or alternatively include (see block 642) corresponding group information such as explicit group identifications. That is, the implicit or explicit group information as detailed in blocks 655, 660, 665, and 670 would also be sent, if used. For instance, the Assistance Data Broadcast Request message 410 in FIG. 4 contains the Concurrent Broadcast IDs information 450 as in block 655 and this is the information indicating to the base station that the base station is to admit or not admit for broadcasting one or more of the positioning assistance data blocks. It is also noted that if block 655 is performed, then in block 675 the E-SMLC 190 sends separate assistance data broadcast request messages 410 for different ranks or different groups.

The E-SMLC 190 in block 650 receives from the eNB 170 indication(s) of success in broadcasting the positioning assistance data blocks 425 and/or indication(s) of failure in broadcasting the positioning assistance data blocks 425 (e.g., based on lack of resources at the eNB). The E-SMLC 190, in response to a failure, may not do anything. One purpose of the rank and concurrent broadcast IDs is that the eNB has determined the suitable set of SIBs to broadcast based on available resources. It is possible that the E-SMLC may retry later (e.g., after a period of time where the load situation may improve), but this is not addressed here. Also, the E-SMLC failure behavior may be implementation specific.

It is noted that the example of FIG. 6 might use, e.g., both rank information and Concurrent Broadcast IDs. In the alternative, only rank information might be used. In this case, the E-SMLC 190 sends only Rank information 440, and the eNB 170 determines which SIBs to broadcast based on the Rank information 440. In another alternative, only Concurrent Broadcast IDs might be used. In this case, the E-SMLC 190 sends only Concurrent Broadcast ID information 450, and the eNB 170 determines which SIBs to broadcast based on the Concurrent Broadcast ID information 450. This would leave it up to the eNB 170 to determine which groups are to be admitted or not be admitted for broadcast. As a further alternative, these may be combined. For instance, the Rank information 440 could include both grouping and ranking (see block 670). As an example, if the value of the Rank information 440 is 1 (one), this indicates both the group and the ranking (where 1 is a highest ranking in an example). Multiple SIBs for the positioning assistance data blocks 425 could have the same value of 1 (one) or some other value. Thus, the value of the Rank information 440 could indicate both ranking and group. Also according to additional embodiments, grouping could be achieved if some other parameter in the metadata 430 has the same value (e.g., a "positioning method" is the same, as in block 660, which uses positioning type).

Figure 7:
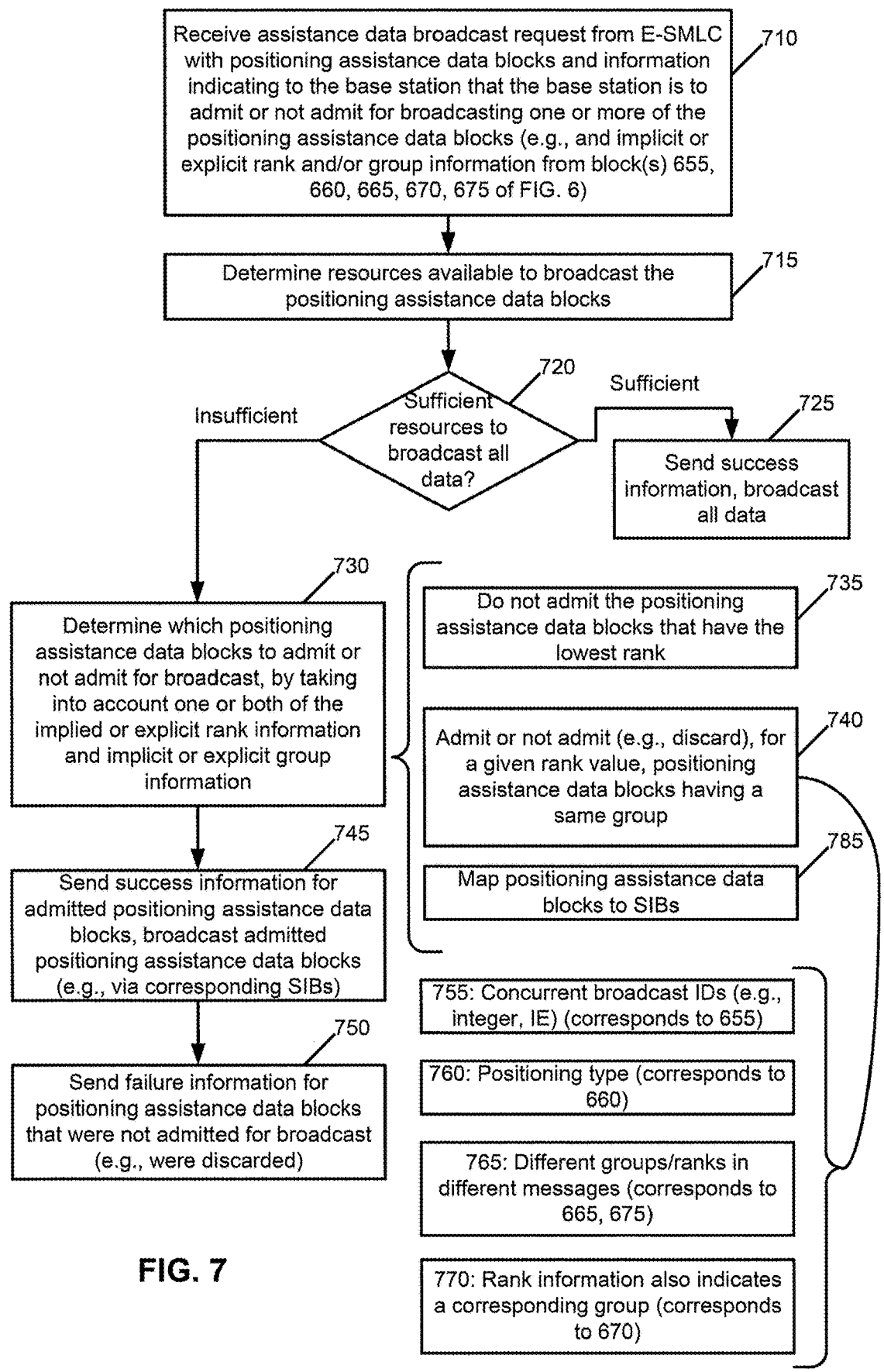
FIG. 7 is a logic flow diagram performed by a base station such as an eNB for ranking and grouping positioning assistance data blocks for broadcast, and illustrates the operation of an exemplary method or methods, a result of execution of computer program instructions embodied on a computer readable memory, functions performed by logic implemented in hardware, and/or interconnected means for performing functions in accordance with exemplary embodiments.

Referring to FIG. 7, this figure is a logic flow diagram performed by a base station such as an eNB for ranking and grouping positioning assistance data blocks 425 for broadcast. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the LA module 150 may include multiples ones of the blocks in FIG. 7, where each included block is an interconnected means for performing the function in the block. The blocks in FIG. 7 are assumed to be performed by a base station such as eNB 170 (or other base station, depending on system and implementation), e.g., under control of the LA module 150 at least in part.

In block 710 the eNB 170 receives an assistance data broadcast request message from E-SMLC with positioning assistance data blocks and information indicating to the base station that the base station is to admit or not admit for broadcasting one or more of the positioning assistance data blocks. The implicit or explicit rank and/or group information from block(s) 655, 660, 665, 670, 675 of FIG. 6 may be received. In block 640, the E-SMLC 190 could communicate, for instance, the use of implicit ranking or implicit grouping to the eNB 170 such that the eNB 170 would know that implicit ranking/grouping is being used. The explicit ranking and/or grouping could be the information indicating to the base station that the base station is to admit or not admit for broadcasting one or more of the positioning assistance data blocks.

The eNB 170 in block 715 determines resources available to broadcast the positioning assistance data blocks 425. In block 720, the eNB 170 considers whether there are sufficient resources to broadcast all the positioning assistance data blocks 425 (e.g., via a number of SIBs). If there are sufficient resources (block 720=Sufficient), in block 725, the eNB 170 sends success information for all of the positioning assistance data blocks 425 and broadcasts (toward the UE 110 or UEs 110) all positioning assistance data blocks 425 (e.g., via the number of SIBs).

If there are insufficient resources to broadcast all the positioning assistance data blocks 425 (block 720=Insufficient), in block 730, the eNB 170 determines which positioning assistance data blocks 425 to admit or not admit for broadcast, by taking into account implicit or explicit rank and/or group information. For instance, the rank information 440 and/or Concurrent Broadcast ID information 450 might be used. Possible techniques for taking into account this information are illustrated by blocks 735 and 740. In block 735, the eNB 170 does not admit the positioning assistance data blocks that have the lowest rank. For example, if there are 12 positioning assistance data blocks but only 10 of those positioning assistance data blocks can be broadcasted via the available resources, the eNB 170 would select the 10 positioning assistance data blocks having the highest rank to admit for broadcast in the 10 SIBs and would select the two positioning assistance data blocks having lower rank than these to not admit (e.g., discard) for broadcast. Note that the actual values that indicate rank could be ordered such that lowest values have highest rank (e.g., importance) and the highest values have the lowest rank (e.g., importance). See the semantics description of the Rank IE 510 in FIG. 5 for an example of this configuration. Note that the opposite (actual values that indicate rank could be ordered such that highest values have highest rank and the highest values have the highest rank) is possible, and other indications of rank are possible. Also, note that this simple example assumes a one-to-one correspondence between positioning assistance data blocks and SIB, but this might not be the case.

In block 740, the eNB 170 admits or does not admit (e.g., discards), for a given rank value, assistance data blocks having a same group. Examples of this are illustrated by blocks 755, 760, 765, and 770.

In block 755, which corresponds to block 655 of FIG. 6, concurrent broadcast IDs are used. Such IDs could be integers, IEs, or other entities. In this example, positioning assistance data blocks 425 having a same value of Concurrent Broadcast ID would be broadcast concurrently. That is, based on rank and Concurrent Broadcast ID, entire groups of positioning assistance data blocks 425 would be admitted or not admitted. As previously described, SIBs having Concurrent Broadcast ID value X should be broadcast concurrently with other SIBs having Concurrent Broadcast ID value X which have the same or higher rank.

In block 760, the group information is implicitly carried by positioning type (where block 760 corresponds to block 660 of FIG. 6). Based on rank and positioning type, entire groups of positioning assistance data blocks 425 would be admitted or not admitted. In block 765, the eNB 170 would receive different groups or different ranks in different messages (the block corresponds to blocks 665 and 675 of FIG. 6.), and the determination of which positioning assistance data blocks to admit or not admit would be performed based on rank information or group information or the combination of rank and group information. In block 770, rank information 440 also indicates a corresponding group (this block corresponds to block 670 in FIG. 6), and the eNB 170 would determine which positioning assistance data blocks to admit or not admit would be performed based on rank information 440 and its implied grouping.

Figure 8A:
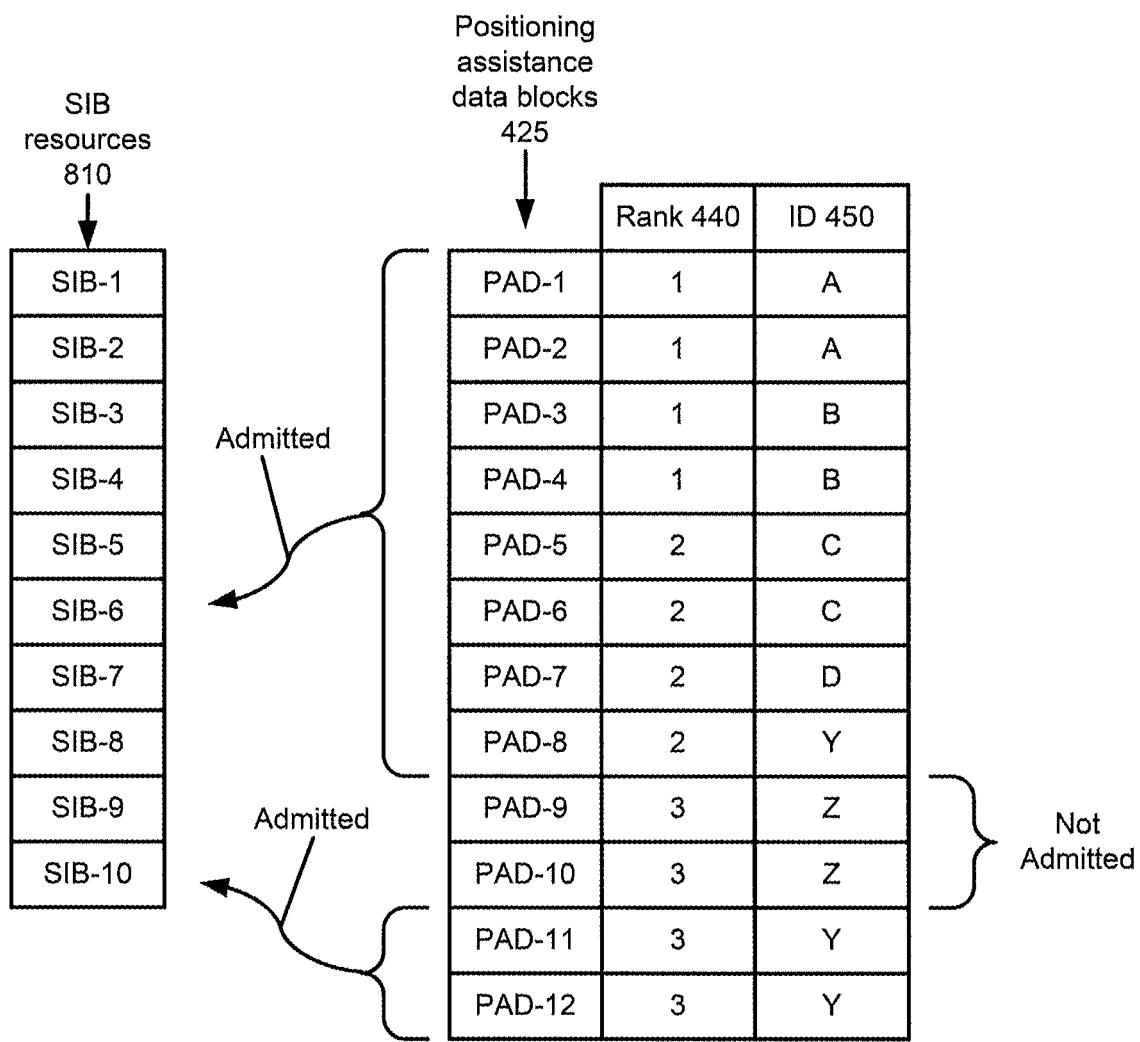
FIGS. 8A and 8B illustrate examples of admitting or not admitting positioning assistance data using both rank information and concurrent broadcast ID information.

With regard to a specific example of block 730, turning to and consider the scenario in FIG. 8, which illustrates an example of admitting or not admitting positioning assistance data blocks using both rank information 440 and concurrent broadcast ID information 450. In FIG. 8A, there are 12 positioning assistance data blocks 425 of PAD-1 through PAD-12, and rank information 440 and corresponding concurrent broadcast ID information 450 is shown for each. The SIB resources 810 are shown as 10 SIBs. Assume there are 12 positioning assistance data blocks (illustrated by PAD-1 through PAD-12) but only 10 of those positioning assistance data blocks can be broadcasted via the available resources 810, assume four positioning assistance data blocks have a rank value of one (1), four positioning assistance data blocks have a rank value of two (2), and four positioning assistance data blocks have a rank value of three (3), and assume that ranks with higher importance have lower numbers (e.g., rank of one is more important than rank of two). In this example, the PAD-1, PAD-2, PAD-3, and PAD-4 have values of rank of 1 (one), PAD-5, PAD-6, PAD-7, and PAD-8 have values of rank of 2 (two), and PAD-9, PAD-10, PAD-11, and PAD-12 have value of rank of 3 (three). Assume that two of the positioning assistance data blocks 425 with rank 3 have Concurrent Broadcast ID value Y, illustrated by PAD-11 and PAD-12. Assume further that two of the positioning assistance data blocks (and corresponding SIBs) with rank 3 have Concurrent Broadcast ID value Z (see PAD-9 and PAD-10), and that one or more of the positioning assistance data blocks with rank 1 or 2 have Concurrent Broadcast ID value Y, and that none of the positioning assistance data blocks (and corresponding SIBs) with rank 1 or 2 have Concurrent Broadcast ID value Z. This is illustrated by the PAD-8 having corresponding value of the rank of 2 and also the Concurrent Broadcast Value of Y. The two positioning assistance data blocks (PAD-9 and PAD-10) having rank value 3 and Concurrent Broadcast ID value Z would then not be admitted and therefore not broadcast. All other positioning assistance data blocks 425 are admitted. Again, note that this simple example assumes a one-to-one correspondence between positioning assistance data blocks and SIB, but this might not be the case.

Figure 8B:
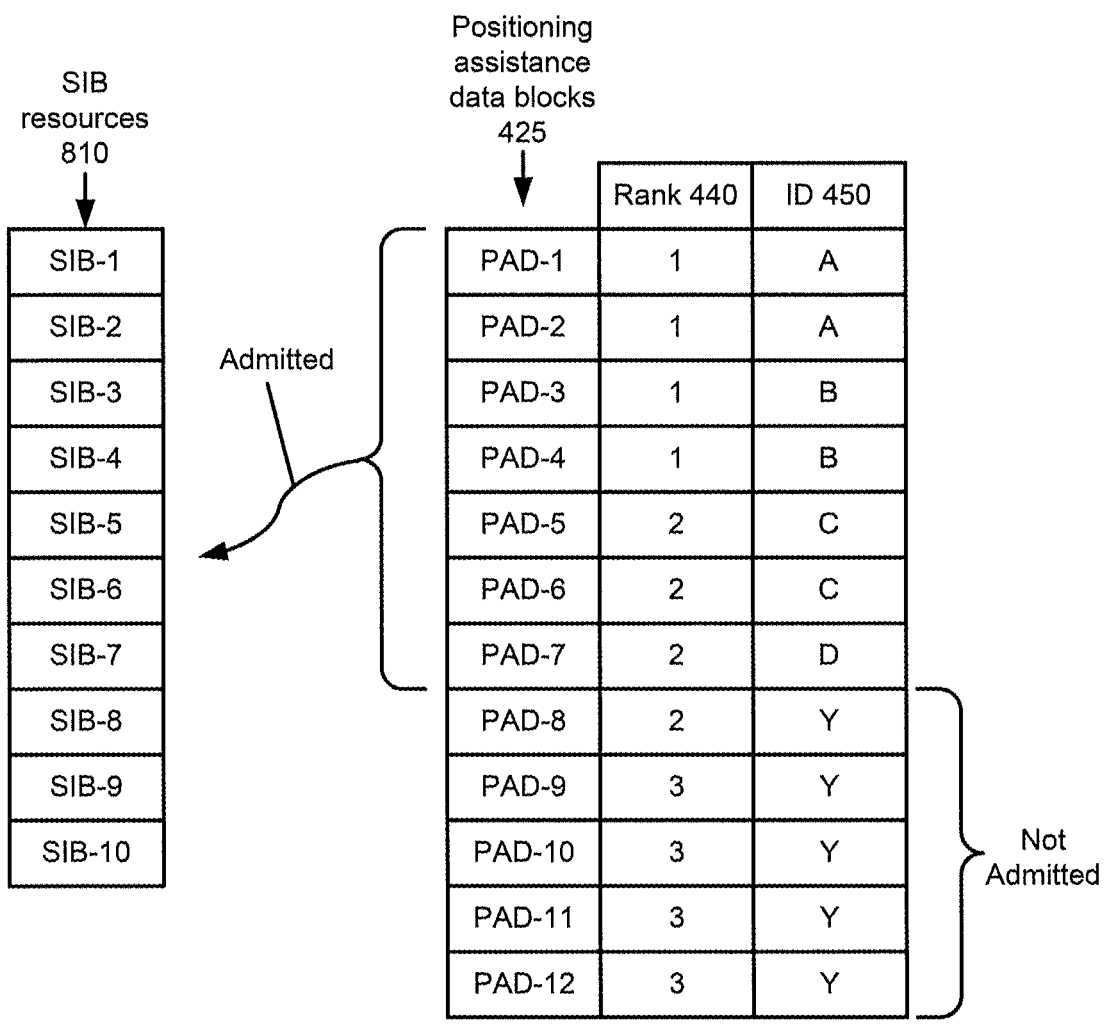

With reference to FIG. 8B, this figure illustrates a slightly different example from FIG. 8A. In this example, the positioning assistance data blocks 425 of PAD-8 through PAD-12 have value Y for Concurrent Broadcast ID 450 (and none have Concurrent Broadcast ID value Z). Because five positioning assistance data blocks 425 of PAD-8 through PAD-12 have Concurrent Broadcast ID value Y, and because these positioning assistance data blocks 425 are all supposed to be broadcast based on the Concurrent Broadcast ID value Y, none of these are broadcasted due to positioning assistance data blocks 425 of PAD-1 through PAD-7 having higher rank or the same rank but different values of Concurrent Broadcast ID 450. The other positioning assistance data blocks 425 of PAD-1 through PAD-7 are broadcast, however.

Returning to FIG. 7, the eNB 170 in block 745 sends success information 470 for admitted positioning assistance data blocks 425 and broadcasts the admitted positioning assistance data blocks 425 (e.g., via SIBs). In block 750, the eNB 170 sends failure information 480 for positioning assistance data blocks 425 that were not admitted for broadcast (e.g., were discarded).

Note that there may be some mapping performed by the eNB 170, in order to determine into which SIBs the positioning assistance data blocks is to be placed and broadcasted. See block 785. Note that this mapping might use the SIB-x metadata 430, e.g., in order for the eNB 170 to determine the type of the positioning assistance data blocks, e.g., OTDOA positioning data, A-GNSS positioning data, RTK GNSS positioning data, and the like, and then to determine corresponding SIBs for that data.

Consider another specific example. An operator would like to broadcast positioning assistance data blocks 425 for both RTK and OTDOA. The different parts of the positioning assistance data blocks map to SIBs as follows (note that this is just an example, and actual mapping still might be decided by 3GPP RAN2).

The assistance data for RTK uses SIBs 31 to 34, as follows:

1) SIB 31 provides basic RTK information needed by all UEs using RTK.

2) SIB 32 provides additional RTK information for medium accuracy.

3) SIBs 33-34 provide additional RTK information for high accuracy. Note that this could be a paid service with the information being encrypted.

The assistance data for OTDOA uses SIB 41.

In this example, Operator A would like to prioritize the SIBs for high accuracy RTK, because the operator expects to generate revenue with this service. Therefore, in this example the Rank and Concurrent Broadcast (Group) IDs are set as follows:

1) SIB 31 has Rank 1, Group X and Y. SIB 31 has highest importance because it is "mandatory" for RTK to work.

2) SIB 33-34 have Rank 2 and Group ID X. These have Rank 2 since the operator prefers SIB 33-34 to be broadcast (as a revenue generating service) over SIB 32 and SIB 41. They both have the same Group ID because both are needed by the UE for high accuracy positioning.

3) SIB 32 has Rank 3 and Group ID Y.

4) SIB 41 has Rank 4 and Group ID Z (or no Group ID since this is the only SIB needed for OTDOA in this example and thus "stand-alone").

Then, in case of insufficient resources, some of the potential outcomes are as follows:

a) SIB 31+SIB 33-34 are broadcast: eNB has enough resources to broadcast Rank 1 and Rank 2, but not Rank 3.

b) SIB 31+SIB 32: eNB does not have enough resources to broadcast Rank 2 (since both SIB 33-34 must be broadcast concurrently and are very large), but does have enough resources to broadcast Rank 3.

Note that a different Operator B may want to deploy the broadcast services differently, and thus allocate the ranks and/or concurrent broadcasting IDs differently.

The exemplary embodiments described above could be used in E-SMLC and eNB supporting Rel-15 broadcast of positioning assistance data. This functionality may also be introduced in 5G and would impact the LMF and gNB.

Exemplary advantages and technical effects of exemplary embodiments herein are as follows. One or more of the exemplary embodiments leave the eNB completely in control of radio resources and avoids introducing radio resource knowledge in the E-SMLC. One or more of the exemplary embodiments provide great flexibility to adapt the broadcasted assistance data to the available system information broadcast capacity. One or more of the exemplary embodiments do not require additional signaling exchanges between the E-SMLC and eNB (e.g., trial and error).

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
   5G fifth generation
   ARP Allocation and Retention Priority
   eNB (or eNodeB) evolved Node B (e.g., an LTE base station)
   gNB 170 base station for 5G/New Radio
   E-RAB E-UTRAN Radio Access Bearer
   E-SMLC Evolved Serving Mobile Location Center
   E-UTRAN Evolved Universal Terrestrial Radio Access Network
   GNSS Global Navigation Satellite System
   ID identification
   IE Information Element
   I/F interface
   info information
   LA Location Assistance
   LPPa LTE Positioning Protocol "a"
   LMF Location Management Function
   LTE long term evolution
   MME mobility management entity
   NCE network control element
   N/W network
   O optional
   OTDOA Observed Time Difference Of Arrival
   PAD positioning assistance data
   Rel release
   RRC Radio Resource Control
   RRH remote radio head
   RTK Real Time Kinematic
   Rx receiver
   SGW serving gateway
   SIB System Information Block
   TS Technical Specification
   Tx transmitter
   UE user equipment (e.g., a wireless, typically mobile device)

What is claimed is:

1. A method, comprising:
   receiving, at a base station and from a network node, an assistance data broadcast request message with positioning assistance data blocks and corresponding information, the information indicating to the base station that the base station is to admit or not admit for broadcasting one or more of the positioning assistance data blocks in response to insufficient resources at the base station to broadcast all the positioning assistance data blocks in the assistance data broadcast request message, and comprising corresponding rank information indicating ranks of the positioning assistance data blocks, where assistance data blocks having a same rank are in a same group and assistance data blocks having different ranks are in different groups, and wherein the positioning assistance data block is to be broadcast to a user equipment for use by the user equipment in calculating a position of the user equipment;
   determining resources available to broadcast the received positioning assistance data blocks toward the user equipment;
   determining which individual ones of the received positioning assistance data blocks should be admitted or not admitted for broadcast based on the determined resources and the information, wherein positioning assistance data blocks having a same rank and group are to be broadcast concurrently or not broadcast by the base station;
   broadcasting, by the base station and toward the user equipment, the admitted ones of the received positioning assistance data blocks using corresponding system information blocks;
   not broadcasting, by the base station, the not admitted ones of the received positioning assistance data blocks; and
   sending, by the base station and toward the network node, indications of success or failure by the base station of broadcasting the positioning assistance data blocks, the success or failure based on admitting or not admitting, respectively, of the positioning assistance data blocks.

2. The method of claim 1, wherein:
   a positioning assistance data block with higher rank is prioritized for broadcast by the base station over a positioning assistance data block with lower rank in response to insufficient resources at the base station to broadcast all the positioning assistance data blocks.

3. The method of claim 2, wherein:
   receiving the assistance data broadcast request message further comprises receiving the assistance data broadcast request message with information identifying groups; and
   determining which individual ones of the received positioning assistance data blocks should be admitted or not admitted for broadcast further comprises determining which individual ones of the received positioning assistance data blocks should be admitted or not admitted for broadcast by using the information identifying the groups in combination with the rank information.

4. The method of claim 3, wherein:
   the information identifying the groups comprises identifications, wherein the identifications comprise one of the following: (1) the identifications are integers and an integer value indicates a corresponding group, or (2) the identifications are in a form of an information element comprising a type able to contain a bit string, wherein a value of the bit string for an individual one of the positioning assistance data indicates a corresponding group; and receiving the assistance data broadcast request message further comprises receiving the assistance data broadcast request message with the positioning assistance data blocks and corresponding rank information and identifications;

determining which individual ones of the received positioning assistance data blocks should be admitted or not admitted for broadcast further comprises determining which individual ones of the received positioning assistance data blocks should be admitted or not admitted for broadcast using the identifications in combination with the rank information, wherein positioning assistance data blocks having a same value of the identifications should be broadcast by the base station concurrently.

5. The method of claim 3, wherein the information identifying the groups comprises positioning type of the positioning assistance data blocks, each positioning type indicating a corresponding group.

6. The method of claim 1, wherein:

receiving the assistance data broadcast request message further comprises receiving different assistance data broadcast request messages;

different ranks are assigned to different assistance data broadcast request messages; and all assistance data blocks listed in a same assistance data broadcast request message are in a same rank.

7. The method of claim 1, wherein the receiving the assistance data broadcast request message and the sending the indications of success or failure are part of a process for long term evolution positioning protocol "a".

8. An apparatus, comprising:

one or more processors; and one or more memories including computer program code, the one or more memories and the computer program code configured, with the one or more processors, to cause the apparatus to perform at least the following:

receiving, at a base station and from a network node, an assistance data broadcast request message with positioning assistance data blocks and corresponding information, the information indicating to the base station that the base station is to admit or not admit for broadcasting one or more of the positioning assistance data blocks in response to insufficient resources at the base station to broadcast all the positioning assistance data blocks in the assistance data broadcast request message, and comprising corresponding rank information indicating ranks of the positioning assistance data blocks, where assistance data blocks having a same rank are in a same group and assistance data blocks having different ranks are in different groups, and wherein the positioning assistance data block is to be broadcast to a user equipment for use by the user equipment in calculating a position of the user equipment;

determining resources available to broadcast the received positioning assistance data blocks toward the user equipment;

determining which individual ones of the received positioning assistance data blocks should be admitted or not admitted for broadcast based on the determined resources and the information, wherein positioning assistance data blocks having a same rank and group are to be broadcast concurrently or not broadcast by the base station;

broadcasting, by the base station and toward the user equipment, the admitted ones of the received positioning assistance data blocks using corresponding system information blocks;

not broadcasting, by the base station, the not admitted ones of the received positioning assistance data blocks; and sending, by the base station and toward the network node, indications of success or failure by the base station of broadcasting the positioning assistance data blocks, the success or failure based on admitting or not admitting, respectively, of the positioning assistance data blocks.

9. The apparatus of claim 8, wherein:

a positioning assistance data block with higher rank is prioritized for broadcast by the base station over a positioning assistance data block with lower rank in response to insufficient resources at the base station to broadcast all the positioning assistance data blocks.

10. The apparatus of claim 9, wherein:

receiving the assistance data broadcast request message further comprises receiving the assistance data broadcast request message with information identifying groups; and determining which individual ones of the received positioning assistance data blocks should be admitted or not admitted for broadcast further comprises determining which individual ones of the received positioning assistance data blocks should be admitted or not admitted for broadcast by using the information identifying the groups in combination with the rank information.

11. The apparatus of claim 10, wherein:

the information identifying the groups comprises identifications, wherein the identifications comprise one of the following: (1) the identifications are integers and an integer value indicates a corresponding group, or (2) the identifications are in a form of an information element comprising a type able to contain a bit string, wherein a value of the bit string for an individual one of the positioning assistance data indicates a corresponding group; and receiving the assistance data broadcast request message further comprises receiving the assistance data broadcast request message with the positioning assistance data blocks and corresponding rank information and identifications;

determining which individual ones of the received positioning assistance data blocks should be admitted or not admitted for broadcast further comprises determining which individual ones of the received positioning assistance data blocks should be admitted or not admitted for broadcast using the identifications in combination with the rank information, wherein positioning assistance data blocks having a same value of the identifications should be broadcast by the base station concurrently.

12. The apparatus of claim 10, wherein the information identifying the groups comprises positioning type of the positioning assistance data blocks, each positioning type indicating a corresponding group.

13. The apparatus of claim 8, wherein:
receiving the assistance data broadcast request message further comprises receiving different assistance data broadcast request messages;
different ranks are assigned to different assistance data broadcast request messages; and
all assistance data blocks listed in a same assistance data broadcast request message are in a same rank.

14. The apparatus of claim 8, wherein the receiving the assistance data broadcast request message and the sending the indications of success or failure are part of a process for long term evolution positioning protocol "a".

15. A computer program product comprising a computer-readable storage medium bearing computer program code embodied therein for use with a computer, the computer program code comprising:
code for receiving, at a base station and from a network node, an assistance data broadcast request message with positioning assistance data blocks and corresponding information, the information indicating to the base station that the base station is to admit or not admit for broadcasting one or more of the positioning assistance data blocks in response to insufficient resources at the base station to broadcast all the positioning assistance data blocks in the assistance data broadcast request message, and comprising corresponding rank information indicating ranks of the positioning assistance data blocks, where assistance data blocks having a same rank are in a same group and assistance data blocks having different ranks are in different groups, and wherein the positioning assistance data block is to be broadcast to a user equipment for use by the user equipment in calculating a position of the user equipment;
code for determining resources available to broadcast the received positioning assistance data blocks toward the user equipment;
code for determining which individual ones of the received positioning assistance data blocks should be admitted or not admitted for broadcast based on the determined resources and the information, wherein positioning assistance data blocks having a same rank and group are to be broadcast concurrently or not broadcast by the base station;
code for broadcasting, by the base station and toward the user equipment, the admitted ones of the received positioning assistance data blocks using corresponding system information blocks;
code for not broadcasting, by the base station, the not admitted ones of the received positioning assistance data blocks; and
code for sending, by the base station and toward the network node, indications of success or failure by the base station of broadcasting the positioning assistance data blocks, the success or failure based on admitting or not admitting, respectively, of the positioning assistance data blocks.

16. The computer program product of claim 15, wherein:
a positioning assistance data block with higher rank is prioritized for broadcast by the base station over a positioning assistance data block with lower rank in response to insufficient resources at the base station to broadcast all the positioning assistance data blocks.

17. The computer program product of claim 16, wherein:
the code for receiving the assistance data broadcast request message further comprises code for receiving the assistance data broadcast request message with information identifying groups; and
the code for determining which individual ones of the received positioning assistance data blocks should be admitted or not admitted for broadcast further comprises code for determining which individual ones of the received positioning assistance data blocks should be admitted or not admitted for broadcast by using the information identifying the groups in combination with the rank information.

18. The computer program product of claim 17, wherein:
the information identifying the groups comprises identifications, wherein the identifications comprise one of the following: (1) the identifications are integers and an integer value indicates a corresponding group, or (2) the identifications are in a form of an information element comprising a type able to contain a bit string, wherein a value of the bit string for an individual one of the positioning assistance data indicates a corresponding group; and
the code for receiving the assistance data broadcast request message further comprises code for receiving the assistance data broadcast request message with the positioning assistance data blocks and corresponding rank information and identifications;
the code for determining which individual ones of the received positioning assistance data blocks should be admitted or not admitted for broadcast further comprises code for determining which individual ones of the received positioning assistance data blocks should be admitted or not admitted for broadcast using the identifications in combination with the rank information, wherein positioning assistance data blocks having a same value of the identifications should be broadcast by the base station concurrently.

19. The computer program product of claim 17, wherein the information identifying the groups comprises positioning type of the positioning assistance data blocks, each positioning type indicating a corresponding group.

20. The computer program product of claim 15, wherein:
the code for receiving the assistance data broadcast request message further comprises code for receiving different assistance data broadcast request messages;
different ranks are assigned to different assistance data broadcast request messages; and
all assistance data blocks listed in a same assistance data broadcast request message are in a same rank.

* * * * *